United States Patent
Linnartz

(10) Patent No.: US 8,494,367 B2
(45) Date of Patent: Jul. 23, 2013

(54) METHOD AND DEVICE FOR MODULATING THE LIGHT EMISSION OF A LIGHTING DEVICE

(75) Inventor: Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 656 days.

(21) Appl. No.: 12/306,349

(22) PCT Filed: Jun. 18, 2007

(86) PCT No.: PCT/IB2007/052326
§ 371 (c)(1),
(2), (4) Date: Dec. 23, 2008

(87) PCT Pub. No.: WO2008/001262
PCT Pub. Date: Jan. 3, 2008

(65) Prior Publication Data
US 2009/0196613 A1 Aug. 6, 2009

(30) Foreign Application Priority Data
Jun. 28, 2006 (EP) .................... 06116228

(51) Int. Cl.
*H04J 14/00* (2006.01)
(52) U.S. Cl.
USPC ............. 398/78; 398/77; 398/96; 398/118; 398/172
(58) Field of Classification Search
USPC ............. 398/77, 78, 96, 103, 115, 118–131, 398/172; 315/149–318
See application file for complete search history.

(56) References Cited

U.S. PATENT DOCUMENTS

| | | | | |
|---|---|---|---|---|
| 4,779,266 A | * | 10/1988 | Chung et al. | 370/441 |
| 6,218,931 B1 | * | 4/2001 | Asghar et al. | 370/479 |
| 6,400,482 B1 | | 6/2002 | Lupton et al. | |
| 6,495,964 B1 | * | 12/2002 | Muthu et al. | 315/149 |

(Continued)

FOREIGN PATENT DOCUMENTS

| | | |
|---|---|---|
| JP | 2005151405 A | 6/2005 |
| JP | 2005176257 A | 6/2005 |
| WO | 0225842 A2 | 3/2002 |
| WO | 2005101916 A1 | 10/2005 |

OTHER PUBLICATIONS

Igarashi et al: "Multirate coherent ultrashort light pulse CDMA communication systems with multipulse PPM and power control", 2004 RISP International Workshop on Nonlinear Circuits and Signal Processing, Mar. 5-7, 2004, pp. 45-48.*

*Primary Examiner* — Li Liu
(74) *Attorney, Agent, or Firm* — John F. Salazar; Mark L. Beloborodov

(57) ABSTRACT

The invention relates to controlling a lighting device, particularly to the modulation of light generated by a solid state lighting (SSL) device. The invention provides a method and device for modulating the light emission of a lighting device by keying each pulse (14) of a sequence of pulses (16) contained in the control signal (10) according to a spreading code. Thus, the light emission of a lighting device may be identified by detecting the spreading code used for modulating the light emission. The invention is particularly suitable for lighting means containing several lighting devices such as a LED lighting board with dozens of LEDs since the light emission of each lighting device may be detected by the spreading code used for modulating the light emission.

8 Claims, 5 Drawing Sheets

U.S. PATENT DOCUMENTS

| | | | |
|---|---|---|---|
| 6,548,967 B1 * | 4/2003 | Dowling et al. | 315/318 |
| 6,560,471 B1 * | 5/2003 | Heller et al. | 600/347 |
| 2003/0067660 A1 | 4/2003 | Oda et al. | |
| 2006/0239689 A1 * | 10/2006 | Ashdown | 398/130 |
| 2007/0110442 A1 * | 5/2007 | Peer | 398/78 |
| 2009/0189530 A1 * | 7/2009 | Ashdown et al. | 315/152 |

* cited by examiner

METHOD AND DEVICE FOR MODULATING THE LIGHT EMISSION OF A LIGHTING DEVICE Application No. PCT/IB2007/052326 filed on Jun. 18, 2007, and published in the English language on Jan. 3, 2008, as International Publication No. WO/2008/001262, which claims priority to European Application No. 06116228.5 filed on Jun. 28, 2006, incorporated herein by reference.

The invention relates to modulating the light emission of a lighting device, particularly to the modulation of light generated by a solid state lighting (SSL) device.

Lighting sources containing several independent lighting devices such as LED lighting boards or modules are becoming more and more popular. A LED lighting board or module typically contains several independently controllable LEDs. LEDs as lighting devices have the advantage of a longer life time than traditional lighting devices such as light bulbs or halogen lamps. Moreover, LEDs have a fast switching time and may be controlled by low voltage electronic signals such as rectangular pulse shape signals. More sophisticated lighting sources contain a controller which may adapt the light emission of the lighting devices contained in a light source according to certain constraints, such as dimming the light emission in accordance with ambient light.

WO02/25842A2 discloses a LED system that employs pulse-width modulation (PWM) to control illumination intensity and pulse code modulation (PCM) to modulate emitted light such that it carries data for wireless data communication. In this system, a control signal is supplied to the LED. The control signal controls the illumination of the LED as well as the data transmission. The illumination intensity of the LED is controlled by the duty cycle, or average "on" time of the control signal. The control signal is further modulated by a data signal while the duty cycle of the control signal is retained such that the intensity of the LED is still controlled during data transmission. The modulation of the control signal is performed by taking an exclusive OR (XOR) of the PWM control signal for the illumination intensity and the PCM control signal for data transmission. Instead of PCM for modulating the data signal onto the control signal, also pulse position modulation (PPM) may be used to modulate the control signal according to the WO02/25842A2.

It is an object of the present invention to provide an improved method and device for modulating the light emission of a lighting device.

In order to achieve the object defined above, the invention provides a method for modulating the light emission of a lighting device, wherein the method comprises the following characteristic features:
  a control signal is generated for controlling the light emission of the lighting device,
  the control signal comprises frames of an equal time duration,
  each frame of the control signal may contain a pulse for switching the lighting device on or off, and
  each pulse of a sequence of pulses contained in the control signal is keyed according to a spreading code for modulating the light emission of the lighting device.

In order to achieve the object defined above, the invention further provides a device for modulating the light emission of a lighting device, comprising
  control signal generation means for generating a control signal for controlling the light emission of the lighting device, wherein
  the control signal comprises frames of an equal time duration,
  each frame of the control signal may contain a pulse for switching the lighting device on or off, and
  the control signal generation means are adapted to key each pulse of a sequence of pulses contained in the control signal according to a spreading code for modulating the light emission of the lighting device.

The characteristic features according to the invention provide the advantage that modulated light emitted from a lighting device may comprise a small amount of data in the form of keying of each pulse of a pulse sequence with a spreading code. The amount of data may be preferably used to easily identify the light emitted from a certain lighting device. The identification may be performed by detecting the spreading code used to key the pulses of the control signal. Furthermore, by keying the pulses of the control signal and, thus, the emitted light with a spreading code, such as it is used in for example code division multiple access (CDMA) mobile phone systems, it is possible to identify a lighting device among a plurality of lighting devices, for example the light emitted by a certain LED contained in a lighting board with dozens of LEDs. This offers a wide range of possibilities of applying the emitted light modulated according to invention, for example to create an adaptive lighting source. Moreover, the invention allows to control more precisely a lighting device, particularly the emitted light such as its intensity, by detecting its emitted light and to adjust for example the duty cycle of the control signal of the lighting device in order to adjust the light intensity.

The term "lighting device" as used herein comprises a lighting device the light emission of which may be controlled by a sequence of pulses, such as a SSL, for example a LED or a semiconductor laser diode. In principle, each lighting device which allows fast modulation, particularly has a fast switching time, is suitable for the purpose of the invention. For example, a suitable device may be also an organic LED (OLED) or a fluorescent or HID lamp. In the case of HID and fluorescent light, it may be preferred not to choose the fully on and off light intensity levels for the modulation but two light levels that are non-zero but sufficiently different to allow these to be distinguished by an electronic detector.

"Switching the lighting device on or off" as used herein is not restricted in its meaning to fully switching off or on a device, for example off=0% and on=100%, but means also an intensity level of a lighting device which may be defined as intensity level of the switched off device or the switched on device, respectively. In other words, "switching the lighting device on or off" means herein switching the lighting device between different levels of intensity of the emitted light. Particularly with HID lamps, switching off may mean powering a HID lamp at 90% instead of 100% when the HID lamp is switched on. Thus, it may be prevented to reignite the HID lamp. In case of a LED as lighting device, switching the LED between 100% and 90% may result in a better performance of the LED light source efficiency.

According to a further embodiment of the present invention, a certain starting position within in each frame may be assigned to the pulses of a control signal. This allows to distinguish the light emission of a certain lighting device not only by determining the spreading code used to key the pulses of the control signal of the lighting device but also by determining the starting positions of pulses of light emission of the lighting device with regard to the frame timing used for the control signal.

A typical example would be a wave form which may be applied as modulation scheme to pulses of the control signal such that only a fraction of each frame is used for modulation in order to allow separation of different light emissions from different lighting devices by a combination of CDMA spreading codes and/or by using different starting positions of a pulse within a frame similar to TDMA (Time Division Multiple Access). In one typical example, only a part of a frame may be provided for the purpose of modulation while the other part of the frame is provided for the purpose of illumination. In another example, instead of reserving a part of a frame for modulation, the modulation may also be performed by varying the starting position of pulses within their respective frames. The modulation may be performed by applying the wave form which for example defines the spreading code used for keying the pulses. Particularly, the wave form may be the spreading code itself used to key each pulse of a sequence of pulses contained in the control signal.

According to an embodiment of the invention, Pulse Position Modulation PPM, or On-Off Keying OOK may be applied as modulation scheme to pulses of the control signal.

When OOK is used as modulation scheme, a pulse may comprise a first part which is provided for OOK keying and a second part which is provided for controlling the illumination of the lighting device according to an embodiment of the invention. In fact this can also be interpreted as a kind of PWM in which both the data and the illumination determine the pulse duration, such that the illumination determines the average pulse width while the data determines the actual value in each specific frame.

When PPM is used as modulation scheme, the position of the beginning of a pulse within a frame may be selected depending on the keying according to an embodiment of the invention.

According to an embodiment of the invention, the average pulse width may be chosen such that a desired illumination is achieved.

According to a further embodiment of the invention, the light emission of several lighting devices may be modulated by generating a control signal for each of the lighting devices and assigning to each control signal an unique spreading code. For example, the invention allows to control each LED of a lighting board with dozens of LEDs, particularly the intensity of each LED may individually be controlled.

According to a further embodiment of the present invention, the starting positions of pulses within the frames of at least one first control signal differ from the starting positions of pulses within the frames of at least one second control signal. Thus, light emissions from different lighting devices may not only be separated by their spreading codes used to key pulses of the respective control signals, but also by determining their positions within the frames allowing to distinguish more different lighting devices than different spreading codes were used to key the control signals. For example, if CDMA spreading codes are used to key the pulses of control signal, the different starting positions of pulses of different control signals may be regarded as TDMA approach for differentiating the light emissions from different lighting devices.

According to a further embodiment of the invention, a computer program is provided, wherein the computer program may be enabled to carry out the method according to the invention when executed by a computer. For example, the computer program may generate the control signal digitally, and the generated control signal may then be output over an interface of a computer to a lighting device such as a LED or to a certain LED of a lighting board.

According to an embodiment of the invention, a record carrier such as a CD-ROM, DVD, memory card, floppy disk or similar storage medium may be provided for storing the computer program according to the invention.

A further embodiment of the invention provides a computer which may be programmed to perform a method according to the invention and may comprise control signal generation means for controlling at least one lighting device. The control signal generation means may be for example implemented by an interface card for coupling the computer with one or more lighting devices for controlling the light emission of these lighting devices. A typical example may be a lighting board containing thousands of LEDs, wherein each of the LEDs may controlled by the computer executing the program implementing the method according to the invention.

According to a further embodiment of the invention, a method for generating an adaptive illumination with at least one lighting device is provided, wherein the light emission of the at least one lighting device may be modulated according to the inventive method described above and the illumination is adapted by detecting the light emitted by the at least one lighting device by means of the spreading code assigned to the lighting device and to modulate the light emission depending on the detected light and according to a predefined control algorithm. This embodiment allows to implement for example an adaptive lighting depending on the predefined control algorithm. For example, the control algorithm may be implemented to evaluate the detected light and to modulate the light emission in correspondence with a lighting function implemented by the control algorithm. The control algorithm allows to implement various lighting functions, for example to control the illumination of a lighting device depending on environmental light.

According to an embodiment of the invention, a device according to the invention may be provided, wherein the control signal generation means are adapted to perform a method according to the invention.

According to a further embodiment of the invention, the device may comprise a plurality of lighting devices and the control signal generation means may be adapted to generate a corresponding number of control signal for the lighting devices. Preferably, several of the generated control signals depend on their spreading codes so that the light emitted from the lighting devices may distinguished from the light emitted from other lighting devices.

According to a further embodiment of the present invention, the control signal generation means may comprise
  a signal source adapted for generating a basic signal for a certain lighting device,
  spreading code generation means adapted for generating a spreading code assigned to a certain lighting device,
  combining means provided for combining the basic signal generated by the signal source and the spreading code generated by the spreading code generation means to a sequence of chips,
  a pulse generator adapted for generating a modulated control signal in accordance with the sequence of chips, and
  an intensity controller adapted for controlling the intensity of light emission.

The control signal generation means may be for example implemented by an algorithm performed by a processor. However, they may also be implemented in hardware, for example in form of a LED lighting board microcontroller containing a device according to the invention with the control signal generation means for directly controlling the LEDs of the LED lighting board.

Finally, the invention relates according to a further embodiment to a detector device for detecting light modulated by a method according to the invention, wherein the detector device comprises a light receiving unit, which for example contains light sensitive sensors such as photodiodes, being adapted for receiving the modulated light and converting the modulated light in a corresponding modulated electrical signal, a demodulation unit adapted for demodulating the modulated electrical signal according to the spreading code used for modulating the control signal for generating the modulated light, and a processing unit adapted for processing the demodulated electrical signal.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

Figure 1:
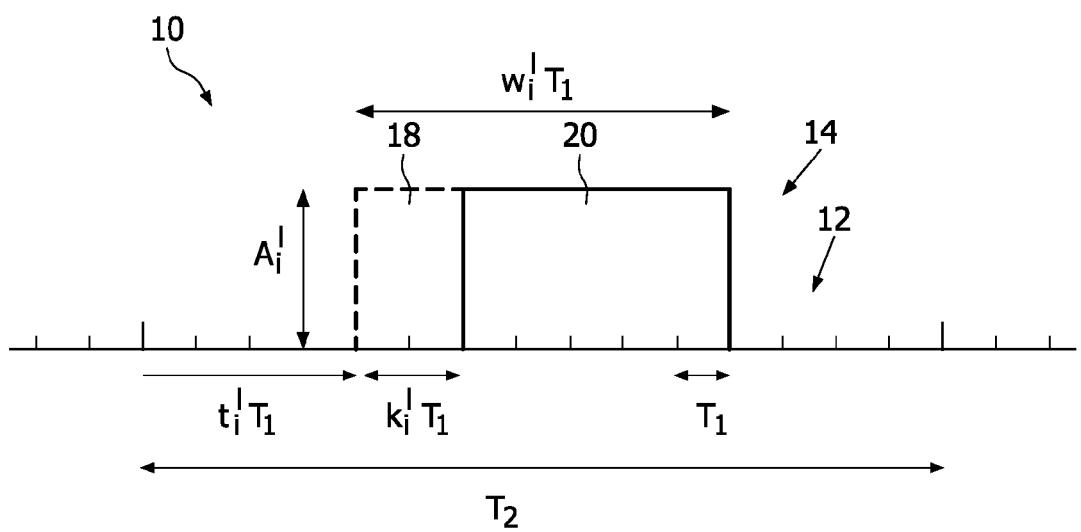
FIG. 1 shows an example of a pulse of a control signal according to the invention.

In the following, the invention is described by means of embodiments with LEDs as lighting means although this may not be understood as restrictive to the invention.

According to the invention, an efficient method to simultaneously perform two functions is provided:

adaptive dimming of the light from a lighting device and communicating data via its light. The light intensity can be varied between almost zero and almost full power.

The communication function is designed such that many, for example thousands of LEDs each can carry a small amount of data. The data streams from all LEDs can be used in various ways, for instance to uniquely identify LEDs and to exchange control data used in an illumination system. Another application can be that all (or many) LEDs jointly carry one high rate data signal, while each LED individually carries a fraction of the data.

Examples of applications of the invention are for instance

Adaptive illumination: sensors measure the light contribution from each LED in real-time to optimize the illumination settings adaptively.

Traffic lights, where the light is modulated with local (traffic) information.

Here a traffic light system should allow the illumination to be set close to the maximum power available, while a small fraction of the illumination power is spent to modulate the light with data.

Head- and backlights of vehicles containing LEDs as lighting devices, where emitted light may be modulated such that it transmits data for example to another vehicle.

A museum or a shop where the illumination carries a narration about the objects that are exhibited by transmitting the narration by modulating the lighting devices of the illumination, respectively.

Positioning indoors by measuring the propagation losses, thus the 'distances' to a large number of lighting devices.

Commissioning: after lighting has been installed, the modulation method is used to identify where each LED gives light.

Dimming of a Solid State Lighting (SSL) device such as a LED is typically done by rapidly switching on and off the LED, such that the duty cycle, defined as the ratio of time p ($0 \leq p \leq 1$) that the LED is on, ensures the appropriate amount of light.

For light wave communication of data, various modulation methods may be used as will be described herein. Particularly Pulse Width Modulation (PWM) and Pulse Position Modulation (PPM) are suitable principles.

The invention is related to the case that a lighting device is not only used for the purpose of illumination but also for communication. In particular, the modulation method of light emission of a lighting device according to the invention may satisfy most of the following requirements on-off switching, plus amplitude control (to optimally "ride" the efficiency curve of a lighting device);

modulation must not affect average duty cycle p: p is dictated by the required illumination;

no visible flickering (e.g. DC free codes);

every switch (off-to-on on-to-off) may create CV2/2 of heat: fixed budget for transitions (C: effective capacitance of a LED, V: voltage on the LED);

switching should not cover more than a few % of the pulse to prevent color shifting;

dimming range of at least 1:256 (8 bits);

bandwidth constraints if LEDs are used a lighting devices;

allows multi-user detection for thousands of LEDs, robust against mutual interference;

robust against environmental lighting;

allows control of illumination faster than with 200 msec time constants if fast SSL devices are applied.

For implementation of the invention, a control signal 10 as shown in FIGS. 1 to 5 containing at least one pulse is generated for controlling a LED. A LED clocked at frequency f may achieve a throughput of f bits per second with the invention, and n independent measurements per second of the illumination from l LEDs may be simultaneously performed, such that n times l equals f.

The inventive modulation method may be considered as a form of PWM where each pulse is keyed according to a spreading code. Moreover, not only the code but also the starting position of the pulses may be chosen to accommodate many different transmitters in a lighting system comprising several lighting devices controlled by the inventive method. Furthermore, the average pulse width can be chosen arbitrarily to satisfy an illumination specification.

The following notation for the time scales will be used herein (refer also to FIG. 1 which shows a typical pulse of a control signal for controlling the light emission of a LED and to FIGS. 4 and 5 which show typical pulse sequences 16, 22, 24 of a control signal 10):

$T_1$ ($T_1 = 1/f$) represents the finest time resolution that can be used for switching on and off a LED. For example, $T_1$ may be a few tens of nanoseconds, yet for illumination control applications it often can be sufficient to clock the LEDs at about 1 microsecond.

$T_2 = N_1 T_1$ represents the duration of an interval during which one on and one off switching operation of the LED may be accommodated. A period $T_2$ is called a frame 12.

Figure 4:
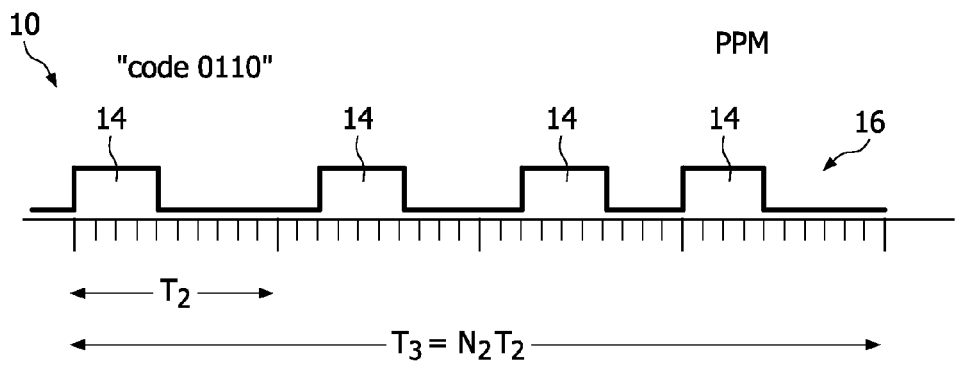
FIG. 4 shows an example of a pulse sequence modulated according to the invention with PPM and keyed with a digital code "0110"
Figure 5:
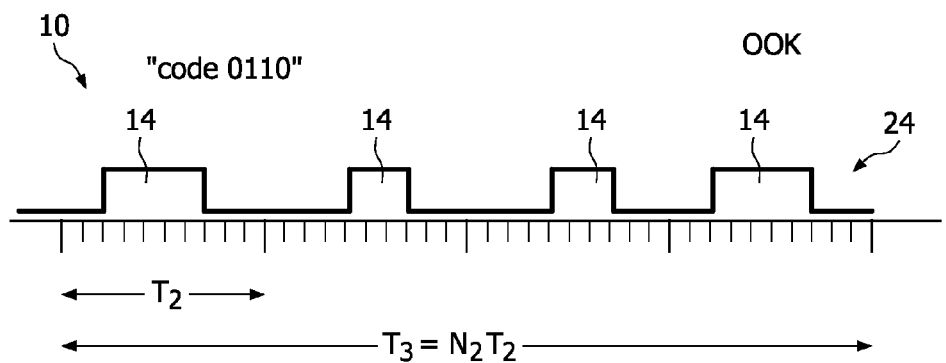
FIG. 5 shows an example of a pulse sequence modulated according to the invention with OOK and keyed with a digital code "0110"

$T_3=N_2T_2$ represents the time interval used for the transmission of one user symbol (a certain code, for example the digital code "0110" as shown in FIGS. 4 and 5), or for one measurement of the light channel transfer.

According to the invention, a lighting system may be designed such that an illumination constraint may be satisfied by a waveform of the control signal 10 defined over periods $T_2$ that consist of $N_1$ units of time, $T_1$, such that the illumination is switched on during (on average) $p_i^l N_1$ units of time, where $p_i^l$ is the duty cycle of the l-th LED in the i-th period $iT_3 \ldots (i+1)T_3$. The data payload of the signal transmitted by the LEDs may be carried by coded sequences of duration $T_3$, comprising $N_2$ of these base pulses each of duration $T_2$.

In an embodiment of the invention, every LED may transmit a time multiplexed combination of a signal S1 which is mainly intended for data communication followed by a burst S2 of illumination which is mainly intended to satisfy the required illumination intensity. A modulation scheme suitable for this purpose is a ON-OFF keying (OOK) scheme since the data is carried by switching a part of the pulse for controlling a LED, namely the signal S1, on or off depending on the data to be carried. However, the data communication function of a control signal may be also implemented by another modulation scheme, such as Pulse Position Modulation (PPM). The modulation scheme PPM according to the invention is described later in more detail. Other pulse shapes, such as return-to-zero pulses can in principle also be applied. Some light sources preferably are modulated in amplitude, with a smaller modulation depth instead of fully switching the light source off during some intervals.

The control signal for every LED has a periodic time interval of duration $k T_1$ seconds—a frame (reference numeral 12 in FIG. 1)—, repeated every $T_2$ ($T_2 > k T_1$) seconds, in which it can transmit one chip of data, based on OOK. For a "1" chip the light is switched "ON" while for a "0" chip, the light is switched "OFF". k is a positive integer, preferably k=1.

A method of coding for groups of N2 successive chips may ensure that that the ratio between the number of 1 and 0 chips is constant. Preferably this ratio is q=½, thus with 50% "1" and 50% "0".

The duration of S2 may be set as follows:
Assume that the required illumination from a LED is such that the duty cycle of the LED needs to be $p_i^l$. The data modulation of the LED contributes the amount k/(2 N1) to the average duty cycle. And the remaining subperiod of T2, of duration (T2−l/(2 N1)) can be used for illumination. Thus, preferably (k/(2 N1)≦$p_i^l$≦(T2−k/(2 N1)), although values outside this interval can be realized if it is permissible that the LED is only switched on in a subinterval of the period assigned for data modulation. For best performance of the data detection the value of $p_i^l$ preferably is fixed during each T3 interval.

Figure 3:
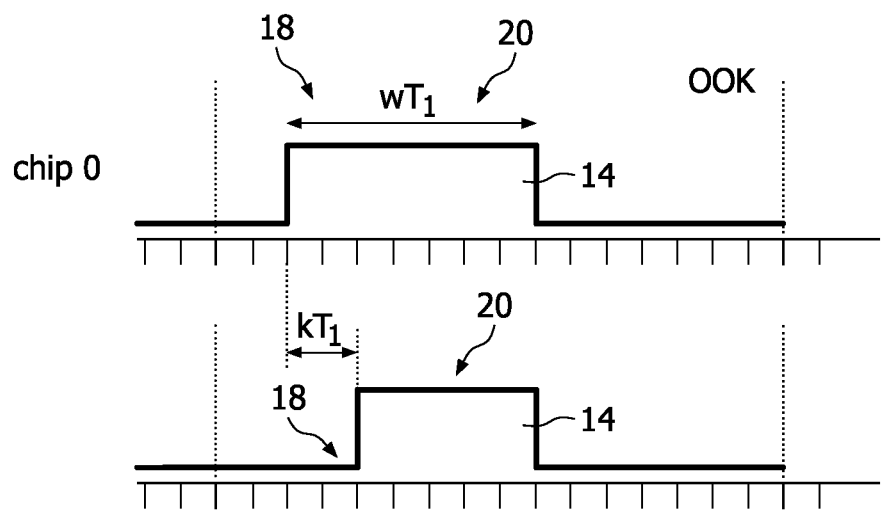
FIG. 3 shows an example of two pulses according to the invention, wherein the two pulses have different codes and are modulated according to OOK.

The basic shape of an "illumination power" pulse offered to a LED is shown in FIG. 1 as a rectangular pulse. The pulse 14 lies within a frame 12 of the control signal 10 according to an embodiment of the invention. A first part 18 of the pulse (the slots 4 and 5, k=2 in FIG. 1) is dedicated to OOK data modulation while the second part 20 (the remaining slots, 6, 7, ...) is dedicated to control the illumination. Thus, signal S1 is carried by the first part 18 and signal S2 by the second part 20 of the pulse 14. The product of the pulse width and pulse amplitude determines the power used for the desired illumination by the LED. In normal operation, this pulse repeats with a frame period of T2. FIG. 3 shows different pulses 14 for a chip "0" and a chip "1". In the upper diagram of FIG. 3, the pulse 14 for a chip "0" has a first part 18 with a high level, and in the lower diagram of FIG. 3, the pulse for a chip "1" has a first part 18 with a low level. The second part 20 of both pulses 14 is always at a high level and essentially determines the lighting intensity.

Applied to a lighting device containing several LEDs, the timing offset $\tau_1^l$ (with $\tau_1^l \in \{0, 1, \ldots, N_l-1\}$), may define the position of the data-modulated part of the pulses of LED l. If LEDs use different positions for modulation, their data signals fall in different intervals and can be separated by a detector, which will be described later.

Figure 2:
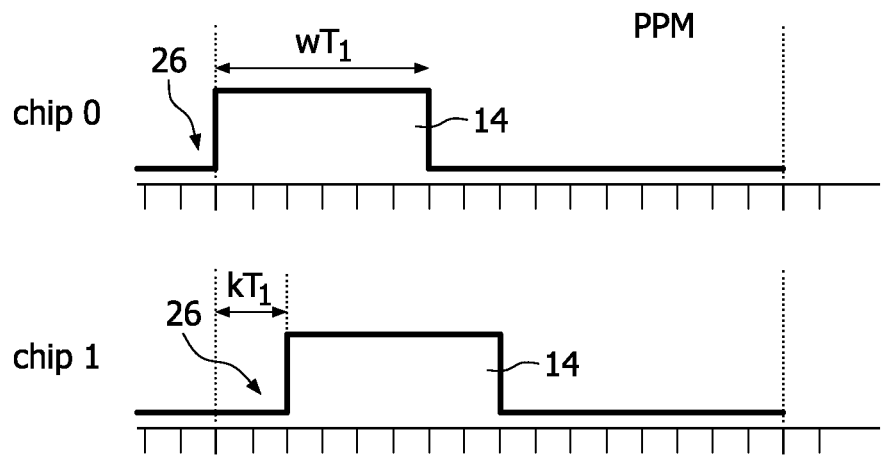
FIG. 2 shows an example of two pulses according to the invention, wherein the two pulses have different codes and are modulated according to PPM.

Instead of using a pulse 14 with a first and second part as shown in FIGS. 1 and 3, a PPM modulation scheme may be used for the pulses, as shown in FIGS. 2 and 4. In FIG. 2, two pulses 14 for "0" and "1" are shown, wherein the data to be carried by a pulse depends on the pulse starting position 26. In other words, PPM is used modulate the data onto the pulses 14 of the control signal 10. In FIG. 2, the pulse 14 shown in the upper diagram carries a chip "0" and starts earlier within the time frame $T_2$, in slot 0 as shown in FIG. 2, than the pulse 14 shown in the lower diagram, which carries a chip "1" and starts with a delay of $kT_1$ with regard to the beginning of the frame 12. The modulation scheme shown in FIG. 2 has the advantage that the electrical energy supplied to a LED within each frame 12 by the pulse 14 is constant and does not depend on the data carried by a pulse in contrast to OOK modulation with which the energy supplied to a LED depends on the data carried by pulse since the duration of a pulse 14 depends on the carried data. However, with OOK the pulse width on average is constant if the ratio of the number of "0" and "1"s in the code is known. Preferably, a set of orthogonal codes may be used and the all "1" (or DC (Direct current)-code) may be excluded. In this case, all remaining used codes are DC-free and by definition contain the same number of "0" and "1"s. This guarantees that for each interval $T_3$, the average duty cycle equals the duration of the illumination pulse plus one half times the duration of the data-modulated part of the pulse.

Now, with regard to FIGS. 4 and 5, it is explained how a sequence of pulses 16 of the control signal 10 may be keyed according to a spreading code for modulating the light emission of a LED according to the invention. The modulated light emission may transmit for example 1 Bit of data. The spreading code used herein is a short 4-chip code "0110". The sequence of pulses 16 is used for at least one of two purposes
to transfer data, for example a bit of information
to allow a detector to measure the local strength of the illumination from that LED.

In FIG. 4, PPM is applied as modulation scheme to the pulses 14 of the sequence, while in FIG. 5 OOK is applied as modulation scheme.

In FIG. 4, the first and fourth pulses 14 of the sequence 16 start at the beginning of their respective frame indicating a "0" chip, while the second and third pulses 14 of the sequence 16 start delayed, by $kT_1$, (k=2) from the beginning of the frame, indicating a "1" chip.

In FIG. 5, the first and fourth pulses 14 of the sequence 16 have a pulse width of five time slots and start delayed, by $kT_1$, (k=2) from the beginning of their respective frame indicating a "0" chip, while the second and third pulses 14 have a pulse width of only three time slots and start delayed, by $kT_1$, (k=4) from the beginning of their respective frame indicating a "1" chip.

In FIGS. 4 and 5, the full code length constituted of $N_2$=4 chips has a period of $T_3$ ($T_3$=4 $T_2$). One bit of actual information can be transferred to a receiver within this period. The opposite polarity of the bit can be sent by using the complementary version of this code ("1001"). If the all-one code is excluded, during this period $N_2$−2 other LEDs can also transmit one bit, even if they use the same position $\tau_i^l$ in the frame to locate their data. Moreover, by assigning the $N_1/k$ other starting positions to a further group of LEDs, $N_1/k-1$ groups of $N_2-1$ other LEDs can also send one bit each, and allow one intensity measurement for each LED.

An illuminating system according to the invention may host a large number of LEDs; therefore different codes (herein also referred to as signatures) have to be assigned to different LEDs in order to separate their signals, i.e., the light emission of each LED. In other words, a code division multiple access approach (CDMA) may be followed according to the invention in order to guarantee different LEDs to coexist in the system without causing interference with each other. Particularly convenient are orthogonal codes that assure the multi-user interference (MUI) to be zero when synchronization is maintained throughout the system. For this reason, all of the LEDs as well as the photo detector may share a common clock. A practical method can be to send clock pulses over the power line to synchronize all LEDs. The detector can be synchronized periodically by letting all LEDs send the same reference pulse, which is known to the detector. Moreover, the coding sequences preferably are perfectly orthogonal, for instance the Walsh-Hadamard codes. Another class of codes may also be applied, namely linear feedback shift register (LFSR) codes. Sequences belonging to this latter class are characterized by a cross-correlation function that is not perfectly null, but very close to zero. An advantage of LFSR is that these allow synchronization errors to occur, without major impact on performance. Different LEDs were assigned a different cyclic shift of the same code.

Figure 6:
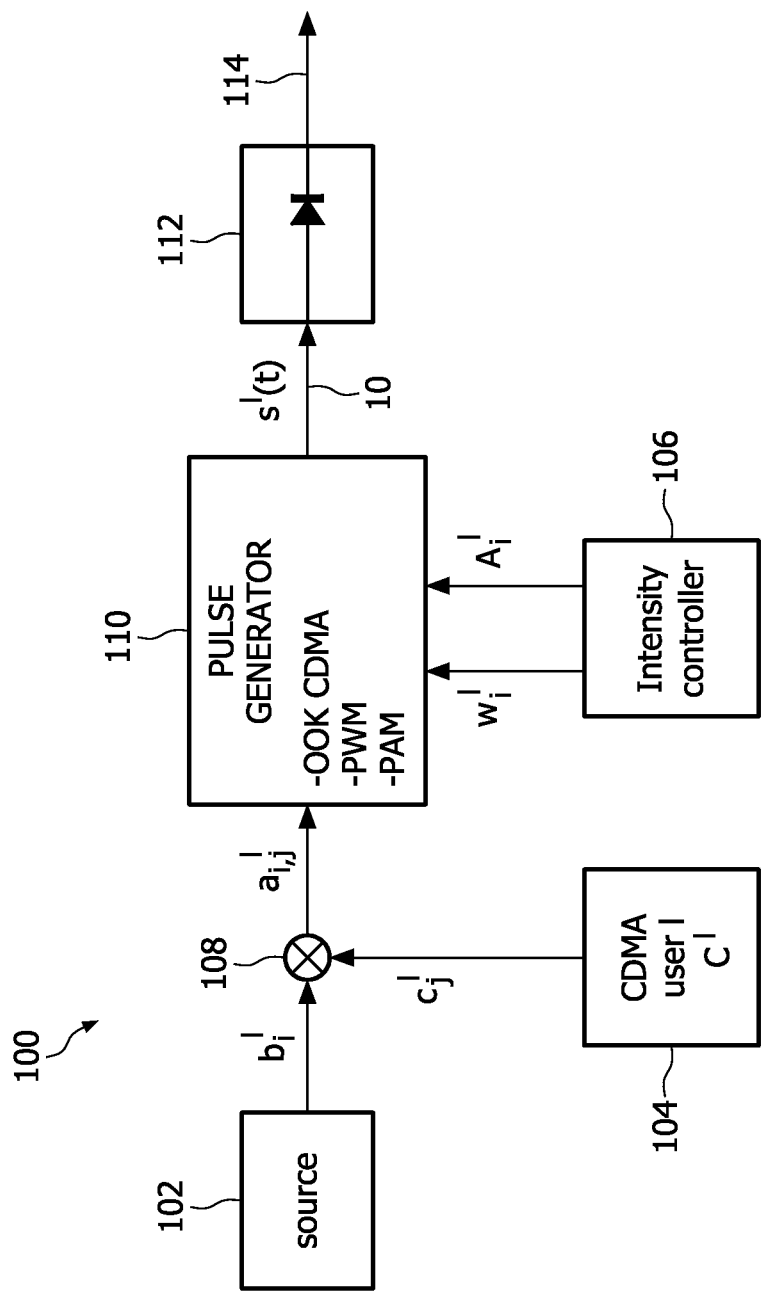
FIG. 6 shows a block diagram of an embodiment of a transmitter architecture of a device for modulating the light emission of a lighting device according to the invention.

FIG. 6 shows a block diagram of the transmitter architecture of a device 100 for modulating the light emission of LEDs according to an embodiment of the invention. The device 100 contains control signal generation means for generation control signals 10 for controlling the light emission 114 of LEDs 112. The control signal generation means comprise a signal source 102 which generates a basic signal $b_i^l$ for a certain LED l, spreading code generation means 104 which generate a spreading code $C^l$ assigned to a certain LED l, respectively, combining means 108 provided for combining the basic signal $b_i^l$ generated by the signal source 102 and the spreading code $C^l$ generated by the spreading code generation means 104 to a sequence of chips $a_{i,j}^l$, a pulse generator 110 adapted for generating a modulated control signal $s^l(t)$ 10 in accordance with the sequence of chips $a_{i,j}^l$, and an intensity controller 106 adapted for controlling the intensity of light emission.

The pulse generator 110 are adapted to generate a OOK CDMA (Code Division Multiple Access) modulated control signal 10. However, they may also be adapted to generate code-keyed PPM control signal 10.

The device 100 is capable of generating control signals for l different LEDs.

In summary, the modulated control signal 10 for a certain LED and generated with the device 100 can be written as $$s_{i,j,n}^l = A_i^l \begin{cases} 0 & \text{for} \quad n = 0, \ldots \tau_i^l - 1 \\ \frac{1 - a_{i,j}^l}{2} & \text{for} \quad n = \tau_i^l, \tau_i^l + 1, \ldots \tau_i^l + k_i^l - 1 \\ 1 & \text{for} \quad n = \tau_i^l + k_i^l, \tau_i^l + k_i^l + 1, \ldots \tau_i^l + w_i^l + \frac{k_i^l}{2} - 1 \\ 0 & \text{for} \quad n = \tau_i^l + w_i^l + \frac{k_i^l}{2}, \tau_i^l + w_i^l + \frac{k_i^l}{2} + 1, \ldots N_1 - 1 \end{cases} \quad (5)$$

where $s_{i,j,n}^l = s^l(iT_3 + jT_2 + nT_1)$. Here i refers to the sequence of information bits $b_i^l$ (with $b_i^l \in \{1, -1\}$) and j indexes the frame. Each chip $a_{i,j}^l$ is obtained by multiplying the current information bit $b_i^l$ by elements in the code sequence $C^l = (c_0^l, c_1^l, \ldots, c_j^l, \ldots, c_{N1-1}^l)$, with $C_j^l \in \{1, -1\}$. In other words, $a_{i,j}^l = b_i^l c_j^l$. So, the data and the elements of the code influence whether the first part of the pulse is present or not, so it influences the start position of the pulse within the frame. After being generated, the electrical signal $s^l(t)$ is converted into light pulses by the LED 112 and then emitted for example over a transmission channel.

Figure 7:
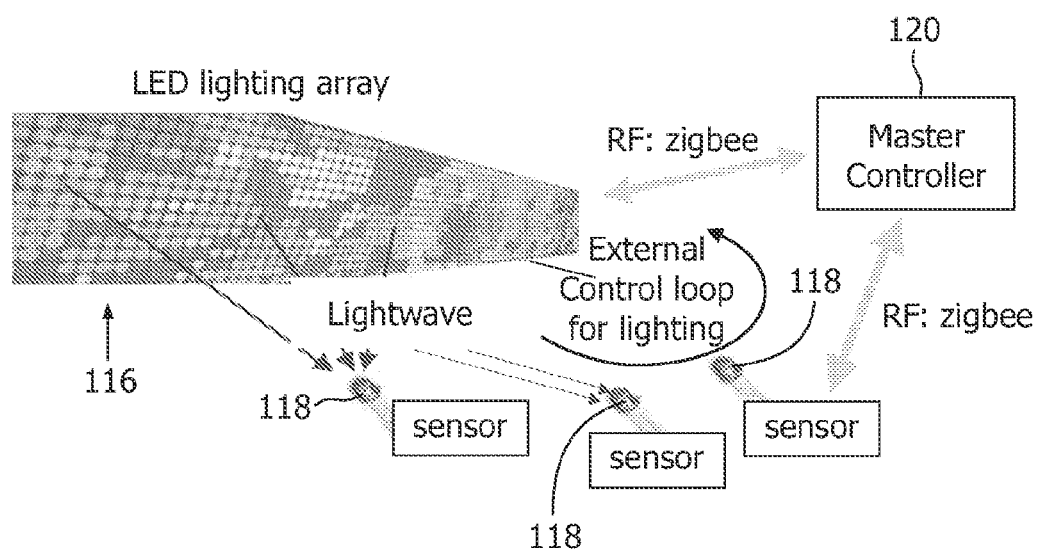
FIG. 7 shows a LED lighting array and a control loop to control lighting according to the invention.

As described before, an illuminating system according to the invention may host a large number of LEDs; therefore different codes (herein referred to them as "signatures") are assigned to different LEDs in order to separate their signals or light emissions, respectively. In other words, a code division multiple access approach (CDMA) is followed in order to guarantee different LEDs to coexist in the system without causing interference with each other. FIG. 7 shows a LED lighting board 116 with dozens of LEDs as an illumination system. The light emissions of the different LEDs of the board 116 are detected by sensors 118 such as photodiodes sensitive for the light emissions of the LEDs. The signals detected by the sensors 118 may be transmitted from the sensors 118, for example, via radio frequency (RF) connections (for example according to the Zigbee RF standard) to a master controller 120 which demodulates the modulated electrical signals output from the sensors 118 and corresponding the sensed light. The master controller 120 may be used to control the light emission of the LEDs depending on the detected light emissions. Thus, an external control loop for controlling the lighting of the board 116 may be implemented. Since the light emission of each LED may be distinguished from the light emissions of other LEDs by detecting the spreading code used for modulating the light emission of a LED, it is possible to control the light emission of single LEDs of the board 116 by applying only a few sensors 118.

As it is clear from previous description this system guarantees a separation of LEDs according to a combination a TDMA (time division multiple access) and CDMA schemes. More precisely, if the LEDs $l_1$ and $l_2$ share the same position of the data-modulated part ($\tau_1^l = \tau_2^l$) their signals will be separated using a different code (picked from the set of orthogonal sequences). The same set of code sequences can be reused without causing any interference by LEDs whose data-modulated part sits in different position. In this latter case LEDs will be distinguished on the base of a TDMA. Hence, each LED $l_1$ has the set of two values $\{\tau_i^l, C^l\}$, where the first one represents a TDMA signature and the second one a CDMA signature.

The system can allocate up to $N_1/k \ N_2$ orthogonal (therefore non-interfering) users or signals, respectively. Some signatures preferably remain unassigned because of special reasons (e.g. $C^l = [1, 1, \ldots, 1]$ represents a DC-signal). Keeping the DC-code unassigned make the system robust against any DC interferer (sun light and other LED that send their illumination pulse), therefore the number of LEDs actually allocated could be smaller.

This scheme allows the illumination-modulated part of pulses (in other words the tails of the pulses) to cross the right boundary of the T2 frame, to provide an arbitrary duty cycle in the range $k_i^I N_1/2 \leq p_i^I \leq N_1 (1-k_i^I/2)$ As mentioned above, this can be done without causing any interference problem because the tail of pulses represents a DC component, but the codes are orthogonal to such an interferer.

Evidently, the system may also be designed such that the constant illumination pulse is located just before the data pulse, rather than just after the data pulse.

Also, a system may be alternatively designed such that the illumination pulse and the data pulse are not concatenated directly. This system performs identically, except that it requires more on-off transitions, which is less favorable in terms of power consumption.

Typical examples of design choices of LED lighting board embodiments of the invention are
  T1=1 microsecond
  N1=1024 (dimming range 10 bits)
  Code size N2=16, Code set: walsh hadamard, except all-one code k=1
  Number of LEDs: up to about 16000 duty cycle: arbitrarily chosen per LED, according to illumination requirements set by room control.

The invention has the main advantage that it allows to modulate the light emission of a lighting device, for example a single LED, multiple LEDs, or a lighting board containing dozens of LEDs, in such a way that the light emission of a certain lighting device may be identified by detecting the spreading code used for modulation of the light emission. The invention is particularly suitable for lighting means containing several lighting devices such as a LED lighting board with dozens, or hundreds of LEDs since the light emission of each lighting device may be detected by the spreading code used for modulating the light emission and, therefore, controlled by light emission controlling means such as for example a room controller which is adapted to control the lighting of a LED lighting board used in a room. Another advantage of the invention is the option to distinguish the light from different light sources by transmitting different spreading codes and/or using different starting positions of the pulses within the frame.

It should be noted that the modulation with a spreading code can also be applied without having a data signal that carries user information. For instance, if the data sequence is just the all "1" sequence, the receiver can still measure the individual light contribution from each light source and control the illumination.

At least some of the functionality of the invention such as the generation of a control signal for controlling the light emission of a lighting device according to the invention, or the method for generating an adaptive illumination with at least one lighting device the light emission of which is modulated according to the invention, may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A computer-executable method for modulating a light emission of a lighting device, the method comprising:
    generating a control signal for controlling the light emission of the lighting device, the control signal comprising a plurality of frames of an equal time duration, and each of the frames including a pulse of a sequence of pulses for switching the lighting device on or off for modulating the light emission of the lighting device, each pulse of the sequence of pulses keyed according to a unique spreading code that particularly identifies the lighting device.

2. The method of claim 1, wherein a predetermined starting position within the at least one frame is assigned to each pulse of the sequence of pulses.

3. The method of claim 1, wherein Pulse Position Modulation (PPM) or On-Off Keying (OOK) is applied as modulation scheme to one or more pulse in the sequence of pulses of the control signal.

4. The method of claim 3, wherein for applying OOK the pulse comprises a first part provided for OOK keying and a second part provided for controlling the illumination of the lighting device.

5. The method of claim 3, wherein for applying PPM the position of the beginning of the pulse within one of the frames is selected depending on the keying.

6. The method according to claim 1, wherein the average pulse width of said pulses is chosen such that a desired illumination is achieved.

7. The method according to claim 1, wherein the light emission of several lighting devices is modulated by generating a control signal for each of the lighting devices and assigning to each control signal an unique spreading code.

8. The method of claim 7, wherein the starting positions of pulses within the frames of at least one first control signal of a first lighting device differ from the starting positions of pulses within the frames of at least one second control signal of a second lighting device.

* * * * *